(12) United States Patent
Gallet

(10) Patent No.: US 9,995,224 B2
(45) Date of Patent: Jun. 12, 2018

(54) SYSTEM FOR SUPPLYING PRESSURED AIR INSTALLED IN AN AIRCRAFT TURBINE ENGINE INCLUDING SEALING MEANS

(71) Applicant: Safran Aircraft Engines, Paris (FR)

(72) Inventor: François Gallet, Paris (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days. days.

(21) Appl. No.: 15/327,719

(22) PCT Filed: Jul. 22, 2015

(86) PCT No.: PCT/FR2015/052012
§ 371 (c)(1),
(2) Date: Jan. 20, 2017

(87) PCT Pub. No.: WO2016/012715
PCT Pub. Date: Jan. 28, 2016

(65) Prior Publication Data
US 2017/0204789 A1    Jul. 20, 2017

(30) Foreign Application Priority Data

Jul. 25, 2014  (FR) ...................................... 14 57192

(51) Int. Cl.
*B64D 37/32*   (2006.01)
*F02C 9/52*    (2006.01)
(Continued)

(52) U.S. Cl.
CPC ................ *F02C 9/52* (2013.01); *B64D 37/32* (2013.01); *F01D 11/005* (2013.01);
(Continued)

(58) Field of Classification Search
None
See application file for complete search history.

(56) References Cited

U.S. PATENT DOCUMENTS 3,596,934 A * 8/1971 De Cenzo ........... F16L 27/1136
                                                      285/145.1
3,777,489 A    12/1973 Johnson
(Continued)

OTHER PUBLICATIONS

Search Report issued in French Patent Application No. 1457192 dated Apr. 14, 2015.
(Continued)

*Primary Examiner* — Woody Lee, Jr.
*Assistant Examiner* — Theodore Ribadeneyra
(74) *Attorney, Agent, or Firm* — Pearne & Gordon LLP

(57) ABSTRACT

A system for supplying pressurized air installed in an aircraft turbine engine, configured to supply pressurization air to a portion of the aircraft for using compressed air from pressurization air collected from a portion for collecting compressed air, characterized in that it comprises a collection port formed on a casing of the compressed air collection portion, a collection member coupled to the collection port, a through port of the collection member formed on a casing of a compartment of the turbine engine, said casing being subjected to small movements relative to the casing of the compressed air portion, the collection member crossing the through port with a freedom of movement relative to the latter during said small movements, a high-pressure space crossed by the collection member, located between the casing of the compressed air collection portion and the casing of the compartment.

11 Claims, 6 Drawing Sheets

US 9,995,224 B2
Page 2

(51) Int. Cl.
 *F01D 17/10* (2006.01)
 *F01D 11/00* (2006.01)
 *F01D 25/24* (2006.01)
(52) U.S. Cl.
 CPC .......... *F01D 17/105* (2013.01); *F01D 25/24* (2013.01); *F05D 2220/323* (2013.01)

(56) References Cited

U.S. PATENT DOCUMENTS

| | | | | |
|---|---|---|---|---|
| 4,066,281 A * | 1/1978 | De Bonis | ............... | F01M 11/02 285/302 |
| 5,106,129 A * | 4/1992 | Camacho | ................ | F16L 27/12 277/616 |
| 6,178,989 B1 | 1/2001 | Windschmitt | | |
| 6,398,485 B1 * | 6/2002 | Frosini | ...................... | F01D 5/08 415/115 |
| 6,709,024 B1 * | 3/2004 | Swinford | .............. | F16L 27/026 285/233 |
| 9,657,585 B2 * | 5/2017 | Takahashi | ............... | F01D 11/24 |
| 2002/0182059 A1 * | 12/2002 | Escure | ................... | F01D 5/082 415/115 |
| 2004/0111829 A1 * | 6/2004 | Bruno | ................... | F01D 9/065 16/2.2 |
| 2009/0091126 A1 * | 4/2009 | Carns | .................. | F16L 39/005 285/123.15 |
| 2010/0001512 A1 * | 1/2010 | Breay | ................... | B64D 37/32 285/50 |
| 2010/0045031 A1 * | 2/2010 | Peachey | .................. | F16L 25/01 285/148.7 |
| 2011/0014046 A1 | 1/2011 | Gallet | | |
| 2011/0070086 A1 | 3/2011 | Gallet | | |
| 2011/0076143 A1 | 3/2011 | Gallet | | |
| 2011/0079018 A1 * | 4/2011 | Pucovsky | ................. | F02C 9/18 60/785 |
| 2011/0243735 A1 | 10/2011 | Balk | | |
| 2011/0305575 A1 | 12/2011 | Balk | | |
| 2011/0311361 A1 | 12/2011 | Charier | | |
| 2012/0099988 A1 | 4/2012 | Charier | | |
| 2012/0152611 A1 * | 6/2012 | Fisher | ................... | B64D 37/32 174/653 |
| 2013/0099490 A1 * | 4/2013 | Kwon | ................... | B64D 37/32 285/417 |
| 2013/0312260 A1 | 11/2013 | Brill | | |

OTHER PUBLICATIONS

International Search Report issued in Application No. PCT/FR2015/052012 dated Nov. 11, 2015.
Written Opinion issued in Application No. PCT/FR2015/052012 dated Nov. 11, 2015.

* cited by examiner

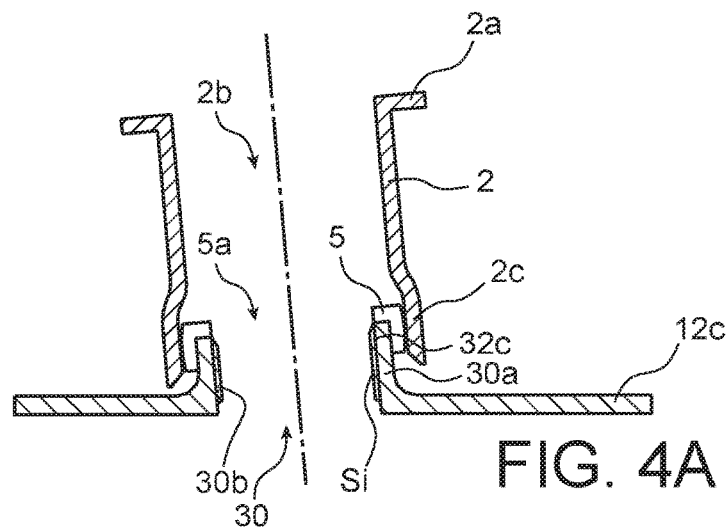
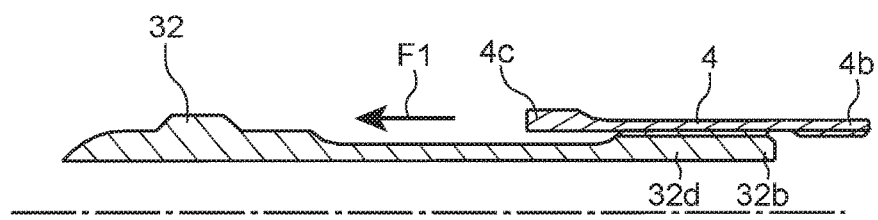
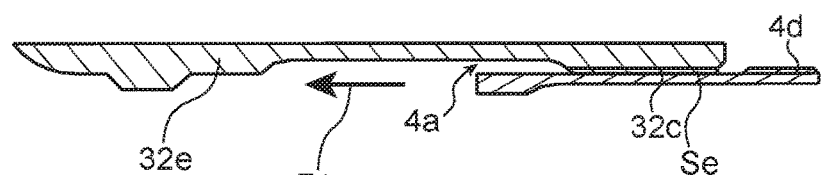
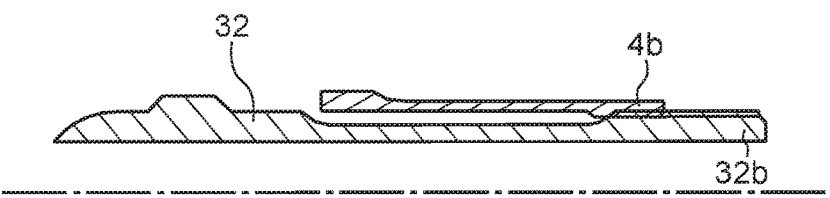
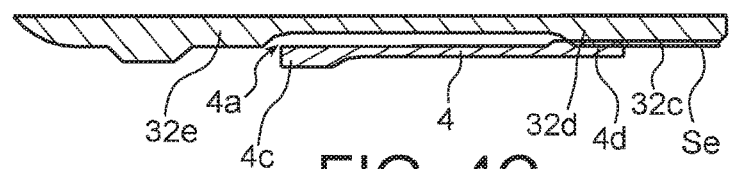

SYSTEM FOR SUPPLYING PRESSURED AIR INSTALLED IN AN AIRCRAFT TURBINE ENGINE INCLUDING SEALING MEANS

TECHNICAL FIELD

The present invention relates to the field of aircraft turbine engines, and more particularly to the general field of systems for supplying pressurised air provided for such turbine engines, especially systems for supplying pressurised air collected from a turbine engine compressor to aircraft fuel tanks.

The invention can be applied to any type of aircraft turbine engines, such as for example turbojet and turboprop engines. More preferentially, the invention can be applied to a twin-spool turbofan engine.

It more precisely relates to a system for supplying pressurised air installed in an aircraft turbine engine and a method for assembling such a system for supplying pressurised air.

STATE OF THE ART

In the general field of aircraft turbine engines, it is known to collect hot pressurised air, usually cooled before being used, for various tasks, for example to perform operations for de-icing the wings, or also for air conditioning purposes, for example of an aircraft cabin during a climb phase, or even also for supplying pressurisation air to aircraft fuel tanks.

In particular, the aircraft fuel tanks have to be supplied with pressurised air in order to reduce therein the fuel partial pressure. In practice, the fuel is usually kerosene. By reducing the presence of fuel vapour in the tank and in proximity to the latter, it is possible to reduce the risks of fuel self-ignition.

To this end, it is known to collect hot pressurised air from an aircraft turbine engine compressor, for example a low or high-pressure compressor. The high temperature of the collected air is due to the high pressure of air in the compressor stage where the collection is performed.

FIG. 1 schematically illustrates, in an axial semi-cross-sectional view, an exemplary turbofan engine 10, rotating around a rotational axis T, on which a hot pressurised air collection is provided from a compressor stage for supplying hot pressurised air to a fuel tank.

The turbojet engine 10 includes, from downstream to upstream in the flowing direction F of the gases inside the turbojet 10, a fan 11, a compressor 12, a combustion chamber 13 and turbines 14, this turbojet 10 being intended to be attached by suitable means under an aircraft wing or on the fuselage rear section of an aircraft.

The fan 11 includes a plurality of fan blades 11a which are attached at their radially inner ends on the periphery of the fan disk 11b of the turbojet 10 which itself attached to the upstream end of a shaft (not shown) of the turbojet 10. The fan blades 11a are externally surrounded by a fan casing mounted at the upstream end of the nacelle 15 which is substantially cylindrical and extends downstream around the compressor 12, from the combustion chamber 13 and the turbojet 10 turbines 14.

This nacelle 15 enables the airflow 16 entering the turbojet 10 to be channelled. Part 16a of this airflow, forming the main stream or primary air, penetrates the compressor 12, then is mixed with fuel and combusted in the combustion chamber 13, to be then injected in the turbines 14 in order to provide power to the rotor blades of the turbines 14 and rotate the shaft of the compressor 12 and of the fan 11.

The other part 16b of the airflow 16 entering the turbojet 10, forming the bypass flow or secondary air, flows around the body of the turbojet 10 inside an intermediate casing 17 and then an outlet fan duct 18 (OFD) surrounded by covers of the nacelle 15, to provide an additional thrust adding to the one provided by the combustion gases ejected from the turbines 14. The cold air from the bypass flow can be used for example to cool hot oil or air circuits, usually using heat exchangers.

The intermediate casing 17 includes two respectively inner and outer coaxial cylindrical ferrules 18 and 19 which are connected to each other by radial arms or bladings 20.

Moreover, the outlet fan duct 18 includes a substantially cylindrical inside wall 22 which is connected to a coaxial inner casing 21 through at least one tubular radial arm 23, also referred to as an "arm of ancillaries", inside which ancillaries such as fluid flowing conduits and electrical cables pass. The outlet fan duct 18 is attached at its upstream end on the downstream end of the outer ferrule 19 of the intermediate casing 17, and at its downstream end on the upstream end of a nozzle (not shown) of the nacelle.

Furthermore, FIG. 1 also depicts the fan zone or compartment ZF comprised between the covers of the nacelle 15 and the elements 17 and 18 which externally delimit the stream of the bypass flow. The compartment formed by the inner casing 21 is referred to as the core zone ZC, and is connected to the fan zone ZF by the arm of ancillaries 23.

In an implementation developed by the applicant, in order to ensure the pressurisation of a fuel tank of the plane fitted with the turbojet 10, it is provided a hot pressurised air collection circuit, schematised by the arrowed path P in FIG. 1, from a stage 12a of the compressor 12. In particular, to ensure the necessary pressure in the fuel tank, it is provided a hot pressurised air collection at the stage 12a of the compressor 12 the access of which makes it necessary to manufacture a collection tube 32 (represented in FIGS. 2A and 2B) which crosses a high-pressure space 33 (that can be substantially considered as a pressurised chamber) which can also be used for other purposes of air collection on the turbojet 10. The pressure in the high-pressure space 33 is the one of a stage 12b of the compressor 12, located downstream of the stage 12a at which the hot air collection is made.

The collection tube 32 is provided to be coupled to a line of the hot pressurised air collection circuit which flows inside the arm of ancillaries 23, as represented by the arrowed path P in FIG. 1, so as to connect the core compartment ZC to the fan compartment ZF. And then, once within the fan compartment ZF, the hot pressurised air collection circuit provides a line overlength, as schematised by the loop of the arrowed path P in FIG. 1, which enables the heat exchange surface to be increased between the hot air collection circuit and the ambient air of the fan compartment ZF in order to cool the pressurised air before connecting the hot pressurised air collection circuit to a pylon which connects the turbojet 10 to the plane structure.

For the purposes of illustration, the loop of the arrowed path P is depicted above the secondary stream, but it has to be understood that this loop remains in the fan compartment ZF. Furthermore, the loop is not depicted in its entirety; the dotted lines ending the arrowed path P mean that the loop continues on a path which is not depicted and which leads to an outlet point where the cooling circuit exits the fan compartment ZF to supply the aircraft with pressurised air.

FIGS. 2A and 2B depict enlarged partial views of FIG. 1 at the compressor 12, and in particular at a pair of successive stages 12a and 12b of the compressor 12 surrounded by a high-pressure space 33 which communicates with the downstream stage 12b through a downstream collection port 31. For example, the pair of successive stages corresponds to the third and fourth stages of the compressor. FIGS. 2A and 2B respectively correspond to a situation where a hot pressurised air collection circuit is in its design operation and to a situation where this circuit is accidentally communicated with the high-pressure space 33 due to the collection tube 32 breaking.

The compressor 12, which supplies hot pressurisation air to the fuel tank, includes a hot pressurised air upstream collection port 30, associated with the upstream stage 12a of the pair of stages of the compressor 12, and the abovementioned hot pressurised air downstream collection port 31, associated with the downstream stage 12b of the compressor 12 and located downstream the upstream collection port 30. The temperature of the collected hot air at the upstream collection port 30 is for example lower than 300° C., the one of the collected hot air at the downstream collection port 31 being for example lower than 400° C. Moreover, the upstream collection port 30 is for example located at the second stage 12a of the compressor 12, and the downstream collection port 31 is for example located at the fourth stage 12b of the compressor 12.

Hot pressurised air, collected from the compressor 12 can be used for at least two types of pressurisation air supply, and especially for the supply of a fuel tank through the upstream collection port 30 of the stage 12a of the compressor 12, and for another hot air supply such as a de-icing air supply and/or cabin pressurisation air supply through the downstream collection port 31 of the stage 12b of the compressor 12.

To do so, it is thus provided a hot pressurised air collection tube 32, coupled to the upstream collection port 30, and a high-pressure space 33 coupled to the downstream collection port 31, the collection tube 32 crossing the high-pressure space 33 along a tube portion 32a. The collection tube 32 conveys pressurisation air for the tank along the arrow 34. Similarly, the high-pressure space 33 conveys pressurisation air for another type of supply (de-icing or cabin pressurisation, for example) along the arrow 35, through a fluid conduit 36.

Nevertheless, a case of major identified deterioration concerning this hot pressurised air collection circuit of the compressor 12 is linked to the collection tube 32 breaking, which results in pressurising the fuel tank with too hot air coming from the downstream stage 12b of the compressor 12, which can thus lead to risks of fuel self-ignition.

Indeed, with reference to FIG. 2A which depicts a configuration of design operation regime of the hot air collection circuit of the compressor 12, air located in the high-pressure space 33 does not mix with the one coming from the upstream collection port 30 and which is contained in the collection tube 32. Hot pressurised air crossing the collection tube 32 is therefore hardly heated by hotter air of the high-pressure space 33.

In contrast, with reference to FIG. 2B which depicts a configuration of deterioration of the hot air collection circuit of the compressor 12, the collection tube 12 is damaged by being broken at the portion 32a in proximity to the high-pressure space 33. In this case, a mixing occurs between air contained in the high-pressure space 33 and cold air crossing the collection tube 32 from the upstream collection port 30 of the upstream stage 12a of the compressor 12. In this way, too hot air exiting the downstream stage 12b of the compressor 12 along the arrow 37 is brought to the fuel tanks by the hot pressurised air collection circuit depicted by the arrowed path P in FIG. 1. This too hot air leads to risks of fuel self-ignition in the tanks. By way of example, a temperature of 232° C. not to be exceeded can be required concerning hot air sent by the collection circuit at the inlet of the pylon connecting the turbojet to the plane structure.

There is therefore a need for providing a protection system at the hot pressurised air collection circuit of the compressor 12, to avoid too hot air being injected in the fuel tanks for their pressurisation.

Solutions have been designed by the applicant based in particular on the use of sensors or control valves, but they do not prove totally satisfactory and include several drawbacks. In particular, such solutions can have difficulties in terms of technical feasibility, high cost or even complications for their implementation.

DISCLOSURE OF THE INVENTION

Consequently, there is a need for providing an alternative solution in order to prevent, or at least limit, the entry of too hot pressurised air, for example contained in a high-pressure space, into the pressurisation air collection tube of a part of an aircraft turbine engine, for example of a compressor stage of a turbine engine, this pressurisation air being for example intended to supply a fuel tank. Such a need particularly exists in the event where the collection tube undergoes damages, and in particular a breakage.

In other words, there is a need for making it possible to prevent, or at least to limit, the temperature increase in a fuel tank supplied with hot pressurised air through such a collection tube, in the event of damages of the collection tube, and in particular in the event of the latter breaking.

There is furthermore a need for providing a solution which is simple to be implemented, and for which the weight and size increase is minimised.

The aim of the invention is to at least partially overcome the abovementioned needs and the drawbacks related to the prior designs of the applicant.

The object of the invention is thus, according to one of its aspects, a system for supplying pressurised air for an aircraft turbine engine, configured to supply pressurisation air to a portion of the aircraft for using compressed air from pressurisation air collected from a portion for collecting compressed air of the aircraft turbine engine, characterised in that it comprises:

a port for collecting pressurisation air formed on a casing of the compressed air collection portion of the aircraft turbine engine, a collection member coupled to the collection port to enable the collection and conveyance of the collected pressurisation air towards the portion for using compressed air, a through port of the collection member formed on a casing of a compartment of the turbine engine, said casing being subject to small movements relative to the casing of the portion for collecting compressed air, the collection member crossing the through port with a freedom of movement relative to the latter during said small movements, a high-pressure space crossed by the collection member, located between the casing of the portion for collecting compressed air and the casing of the compartment of the turbine engine, and including pressurised air at a pressure higher than that of the collected pressurisation air, the system for supplying pressurised air also including sealing means located substantially between the casing of the portion for collecting compressed air and the casing of the compartment in order to form a substantially sealed separation between the high-pressure space and a free space communicating with the compartment and provided around the collection member, in order to prevent the entry of pressurisation air from the high-pressure space into the collection member in the event of the latter breaking.

Thanks to the invention, it is possible to enable the supply of pressurisation air to an aircraft portion, for example an aircraft fuel tank, through a pressurised air collection member, for example a compressor stage of a turbine engine, without risking introducing pressurisation air at too high a temperature able to lead especially to risks of fuel self-ignition, even in the event of the collection member breaking. Furthermore, the invention can provide a simple compact solution for protecting the hot pressurised air collection member, which is compatible with environments in which it can be placed.

The system for supplying pressurised air according to the invention can furthermore include one or more of the following features taken individually or according to any possible technical combinations.

The collection member is advantageously made up of a collection tube. Similarly, the protective member, later described, is advantageously made up of a protective tube. Thus, the collection member can make up an inside tube, located inside the protective tube that can as for it make up an outside tube. In particular, the protective tube can make up a locknut for attaching the collection tube on the port for collecting pressurisation air.

The supply system can include a device for supplying pressurised air to at least one fuel tank of the aircraft to which the collection member is coupled.

The portion for collecting compressed air of the aircraft turbine engine can be made up of a compressor stage of the turbine engine, especially a high-pressure compressor. In particular, the collection member can be coupled to a collection port of an upstream stage of the compressor of the turbine engine, and the high-pressure space can have the pressure of a downstream stage of the compressor, which is higher than the pressure of the upstream stage of the compressor.

The collection member can be coupled to a hot pressurised air line located inside an arm of ancillaries of the turbine engine, connecting the core compartment to the fan compartment of the turbine engine.

The sealing means can include a first sealing part disposed around the collection member and in the through port while having a freedom of movement relative to the latter, this first sealing part being connected to the casing of the portion for collecting compressed air by a sealed coupling so as to prevent a significant air leak from the high-pressure space at said coupling.

On the other hand, the sealed coupling can be formed by a second sealing part comprising an outside annular surface forming a spherical surface portion, and the first sealing part can have a free end comprising an inside cylindrical surface which forms a circular line of contact with said spherical surface portion, so that the first sealing part is sealingly hinged to the second sealing part.

As an alternative, it is possible to do without such a second sealing part comprising an outside annular surface forming a spherical surface portion. In particular, it can be possible to form a spherical surface portion on the peripheral surface of the boss, described later, forming the collection port.

The system can further include a holding cover attached to the casing of the turbine engine compartment and crossed by the collection member, this holding cover being arranged to sealingly connect the casing and the sealing means while enabling a freedom of movement of the sealing means relative to the casing.

The first sealing part can include a sliding lead-through plate having a planar portion able to abut against a corresponding planar portion of the holding cover with the possibility of gliding over it, the freedom of movement of the first sealing part being performed in a plane parallel to the planar portion while preventing a movement perpendicularly to this plane.

The collection port can be formed by a boss on the casing of the portion for collecting compressed air, an inner surface of which is formed by a tapped bore configured to cooperate with a threading of the outer surface of a first end of the collection member to enable the attachment of the collection member on the boss of the collection port.

The second sealing part can on the other hand be a substantially annular sealing washer. It can be mounted on the boss of the casing of the portion for collecting compressed air, and can include a through opening for inserting the collection member.

The supply system can further include a clamping joint placed between the collection member, especially a first outer boss of the collection member, and the second sealing part.

Such a clamping joint can be especially made up by a substantially annular spring washer, with or without a lock. For example, it can be selected from the "Belleville" type washers or the single coil spring toothed lock washers.

The collection member can further include a second outer boss, located at a distance from the first outer boss, so that the portion of the collection member located between the first and second outer bosses makes up a mechanically weak zone, that is a zone of mechanical brittleness, which is favoured in case of breakage (i.e. split) of the collection member.

The second outer boss of the collection member can also enable a pressurisation air rate to be limited (or calibrated) in the event of a leak, for example in the event of the collection member and/or the first sealing part breaking. In this case, the second outer boss can be formed on the collection member substantially facing an outer boss of the end of the first sealing part from which the sliding crossing plate extends. The second outer boss of the collection member and the outer boss of the first sealing part can thus define therebetween a flow restricted channel of a pressurisation air rate in the event of a leak.

A protective member forming an at least partial shell around the collection member can be located between the collection member and the first sealing part, and can include an insertion cavity for the at least partial entry of the collection member into the protective member, said protective member being arranged to abut against the second sealing part once the collection member is attached on the boss of the collection port.

The protective member can include a first end mounted on the first end of the collection member, the first end of the protective member especially including a tapped portion intended to cooperate with a threading of the outer surface of the first end of the collection member. The protective member can further include a second free end located at a distance from the collection member and from the first sealing part.

The integrity of the protective member can be ensured by the protective member including a second free end, with no contact with the elements of its environment, the first sealing part abutting against the second sealing part and not against the protective member. As a result, the protective member undergoes no stress and it can therefore never break. Particularly, the protective member can be arranged in the supply system so as to provide a clearance between the second end of the protective member and the collection member, this second end being thus free from any mechanical biasing.

Advantageously, the threading of the outer surface of the first end of the collection member, the tapped bore of the inner surface of the boss of the casing of the portion for collecting compressed air, and the tapped portion of the first end of the protective member, do not make up mechanically weak zones of the supply system so that they cannot break since they hold each other. So, even in the event of the collection member and/or of the protective member breaking, the assembly between the threading, the tapped bore and the tapped portion will be kept.

On the other hand, the first end of the protective member can abut on the second sealing part and be screwed on the first end of the collection member so as to make up a locknut for attaching the collection member on the boss of the collection port.

Finally, the object of the invention, according to another of its aspects, is a method for assembling a system for supplying pressurised air such as previously defined, including the successive steps of:

a) positioning the second sealing part in abutment on the boss of the casing of the portion for collecting compressed air, b) placing the first sealing part in sealed engagement with the second sealing part, c) attaching the protective member on the collection member, especially by screwing the tapped portion of the protective member on the threading of the outer surface of the first end of the collection member, d) attaching the assembly formed by the protective member and the collection member on the collection port, especially by screwing the threading of the outer surface of the first end of the collection member in the tapped bore of the inner surface of the boss, until the protective member contacts the second sealing part, e) possibly, clamping again the protective member on the collection member in order to unit the assembly.

Thus, attaching the protective member on the turbine engine is advantageously carried out through the collection member, on which the protective member was beforehand already attached. It could be considered to have a specific tooling enabling the protective and collection members to be simultaneously attached.

The system for supplying pressurised air and the assembling method according to the invention can include any of the features discussed in the description, taken individually or according to any technically possible combinations with further characteristics.

BRIEF DESCRIPTION OF THE DRAWINGS

The invention can be better understood upon reading the following detailed description, of exemplary non-limiting implementations thereof, as well as upon studying the schematic partial figures of the accompanying drawing, in which:

FIGS. 4A, 4B, 4C and 4D illustrate, in axial cross-sectional partial views, four steps of the method for assembling the system for supplying pressurised air of FIG. 3.

Throughout these figures, identical references can refer to identical or analogous elements.

Moreover, the different parts represented in the figures are not necessarily drawn to a uniform scale, in order to make the figures more understandable.

DETAILED DISCLOSURE OF PARTICULAR EMBODIMENTS

Throughout the description, it is noted that the terms upstream and downstream are to be considered with respect to a normal main flow direction F of the gases (from upstream to downstream) for a turbine engine 10. On the other hand, the radial axis of symmetry of the turbine engine 10 is referred to as the axis T of the turbine engine 10. The axial direction of the turbine engine 10 corresponds to the axis of rotation of the turbines, which is also the direction of the axis T of the turbine engine 10. A radial direction of the turbine engine 10 is a direction perpendicular to the axis T of the turbine engine 10. Furthermore, unless otherwise indicated, the adjectives and adverbs axial, radial, axially and radially are used in reference to the abovementioned axial and radial directions. Moreover, unless otherwise indicated, the terms inside and outside are used with reference to a radial direction so that the inside part of an element is closer to the axis T of the turbine engine 10 than the outside part of the same element.

Figure 1:
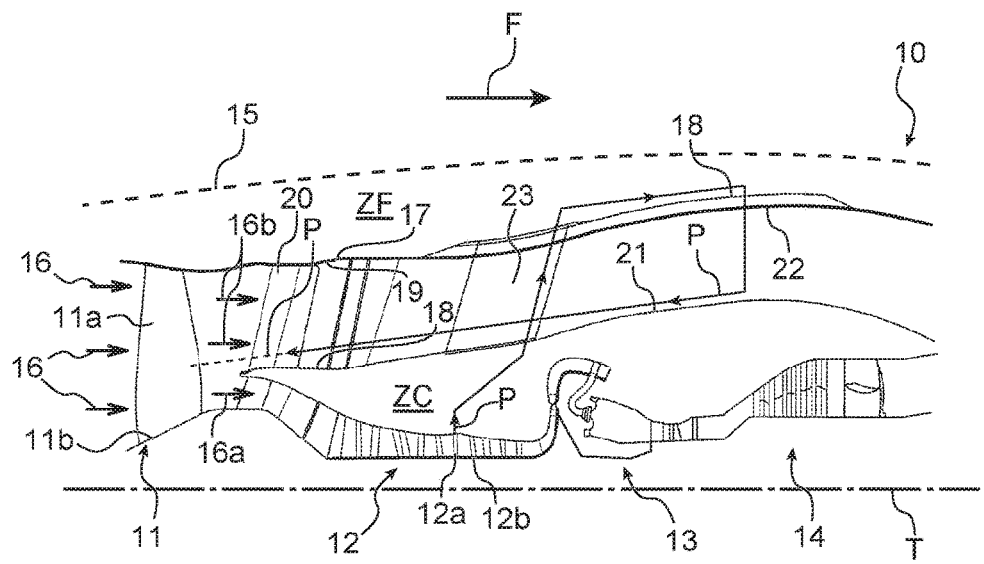
FIG. 1 illustrates, in an axial semi-cross-sectional view, an exemplary aircraft turbojet on which a hot pressurised air collection is provided from a compressor stage.
Figure 2A:
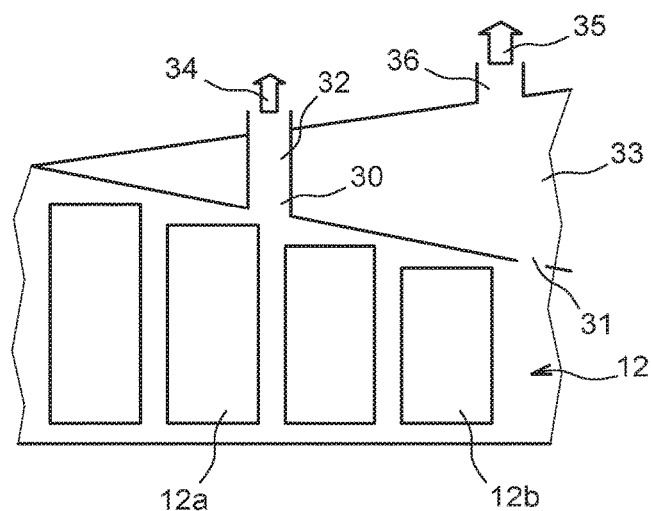
FIGS. 2A and 2B are enlarged partial views of the turbojet of FIG. 1 at the compressor, respectively when the hot pressurised air collection circuit is in its design operation and in case of a deterioration of this circuit.
Figure 2B:
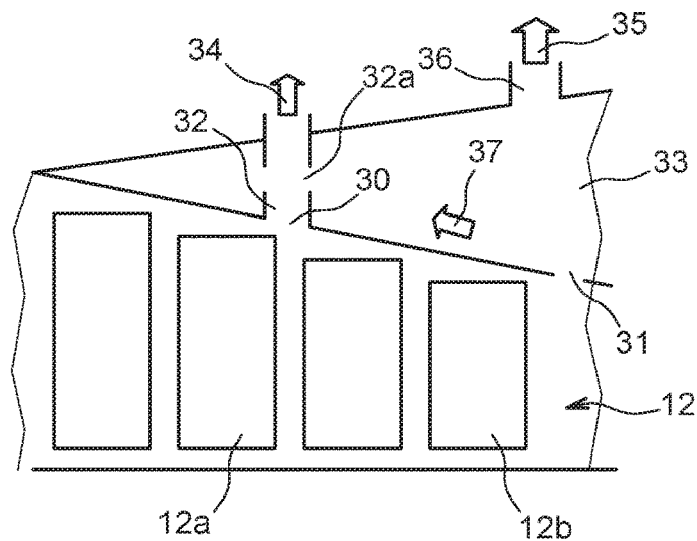

FIGS. 1, 2A and 2B have already been described previously in the part related to the technical background of the invention.

Figure 3:
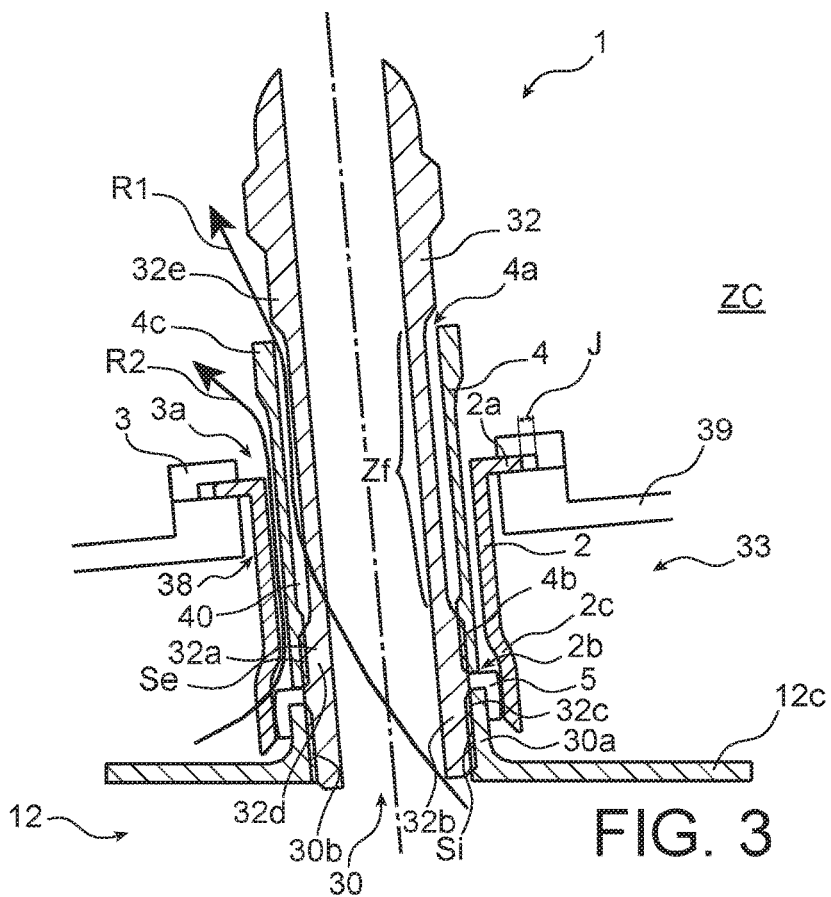
FIG. 3 depicts, in an axial partial cross-sectional view, a first exemplary implementation of a system for supplying pressurised air in accordance with the invention.
Figure 4D:
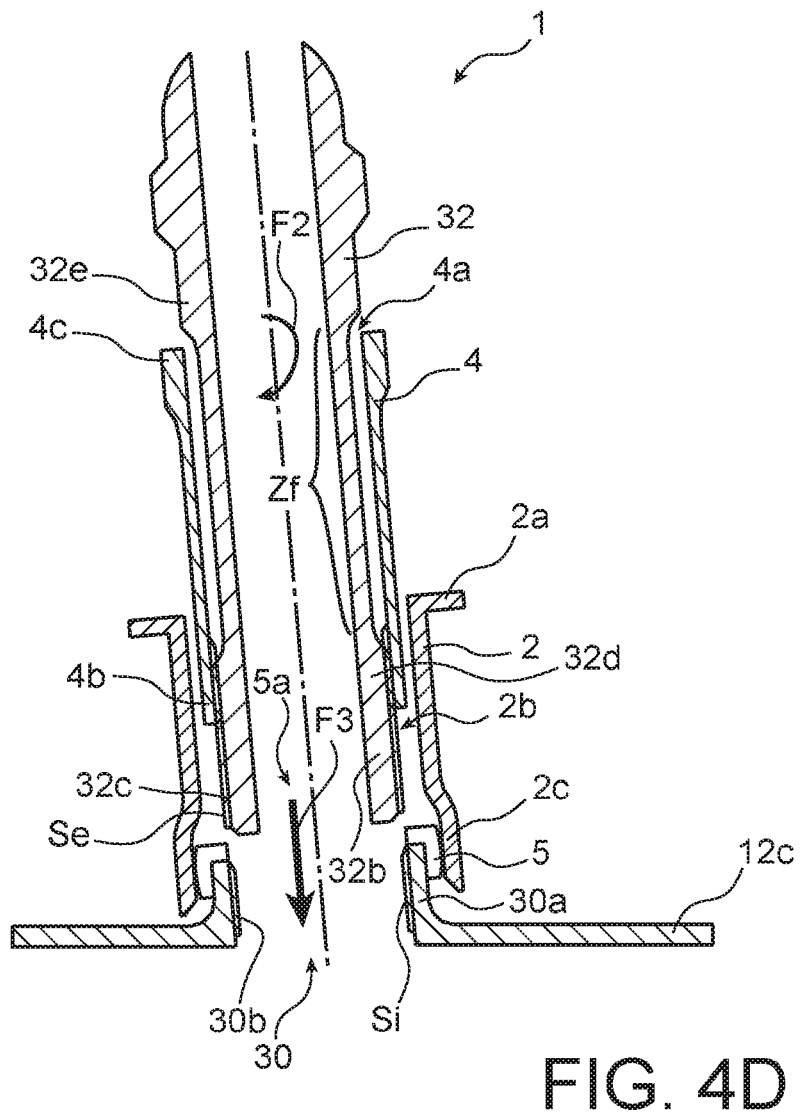
Figure 5:
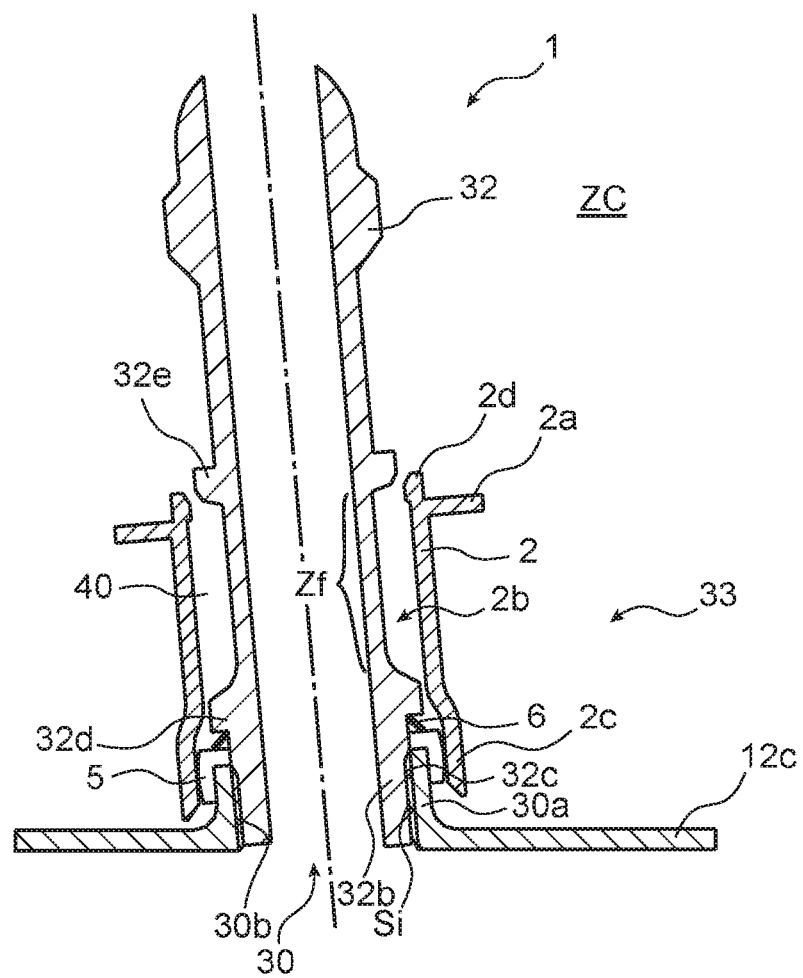
FIG. 5 represents, in an axial partial cross-sectional view, a second exemplary implementation of a system for supplying pressurised air in accordance with the invention.

With reference to FIGS. 3 and 5, it has been respectively represented, in an axial partial cross-sectional view, first and second exemplary implementations of systems 1 for supplying pressurised air in accordance with the invention. FIGS. 4A, 4B, 4C and 4D illustrate as for them, according to axial cross-sectional partial views, four steps of the method for assembling the system for supplying pressurised air of FIG. 3.

Throughout these examples, it is considered that the aircraft turbine engine 10 can be such as the one previously described with reference to FIG. 1, so that the elements described with reference to FIG. 1 will not be described again in the present detailed description. However, the turbine engine 10 could be of another type, and could especially correspond to a twin spool turbofan engine.

On the other hand, for each of the exemplary implementations described below, it is considered that hot pressurised air which flows in the supply system in accordance with the invention is intended to supply at least one fuel tank of the aircraft, in order to pressurise it and thus avoid risks of fuel self-ignition.

Moreover, it is considered that the supply system 1 includes a hot pressurised air collection tube 32 from an upstream stage 12a of a compressor 12, especially a high-pressure compressor, of the turbine engine 10, as previously described with reference to FIG. 1. A collection tube 32 crosses a high-pressure space 33 the pressure of which is the one of a downstream stage 12b of the compressor 12 which is higher than the pressure of the upstream stage 12a of the compressor 12. Also, the object of the sealing means of the supply system 1 described below is especially to overcome a failure case resulting from this collection tube 32 breaking.

Of course, these choices are in no way limiting. Particularly, the supply system 1 could be provided to enable pressurised air to be collected on another part of the turbine engine 10, and could also enable a part of the aircraft other than a fuel tank to be supplied, and for example be used for wing de-icing operations, or also for air conditioning purposes, for example of the aircraft cabin during a climb phase.

In FIG. 3, it is partially represented a first exemplary implementation of a system 1 for supplying pressurised air in accordance with the invention.

The system 1 thus first includes a port for collecting 30 pressurisation air formed on the casing 12c of the compressor 12.

A collection tube 32 (inside tube) is moreover coupled to the collection port 30 to enable the collection and conveyance of pressurisation air from the upstream stage 12a of the compressor 12 towards the aircraft fuel tank.

Moreover, the system 1 for supplying pressurised air includes a through port 38 of the collection tube 32. The through port 38 is formed on the casing 39 of the core compartment ZC of the turbine engine 10, this casing 39 being subject to small movements relative to the casing 12c of the compressor 12. The expression "small movements" means in particular a relative movement of the casing 39 of the core compartment ZC with respect to the casing 12c of the compressor 12, caused by the mechanical stresses and expansions to which the casing are submitted. For example, the casing 12c of the compressor 12 can be submitted to higher temperatures than the casing 39 of the core compartment ZC. Moreover, during the operation of the turbine engine 10, thrusts and torques generated by the turbine result in temporary deformations of each casing which imply small relative movements between the casings. As a result of these relative movements, the collection port 30 and the through port 38, which substantially extend along a same axis corresponding to the axis of the collection tube 32, can be slightly misaligned in operation. The distance between both ports 30 and 38, as well as the angle between both casings 12c and 39, can also vary faintly. For these reasons, it is desired that the collection tube 32, which is attached to the collection port 30 of the casing 12c and therefore follows the movement of this port 30, crosses the through port 38 with a freedom of movement relative to the latter so as not to contact the casing 39 during said small movements. An abutment of the collection tube 32 on the casing 39 would indeed generate stresses on the tube which would be likely to result in its breakage.

Furthermore, the collection tube 32 crosses a high-pressure space 33 along a collection tube portion 32a, the high-pressure space 33 being located between the casing 12c of the compressor 12 and the casing 39 of the core compartment ZC.

The high-pressure space 33 includes air under a pressure higher than the one of the pressurisation air collected from the upstream stage 12a of the compressor 12.

In accordance with the invention, the system 1 for supplying pressurised air advantageously includes sealing means 2 substantially located between the casing 12c of the compressor 12 and the casing 39 of the core compartment ZC to form a substantially sealed separation between the high-pressure space 33 and a free space 40 communicating with the core compartment ZC and provided around the collection tube 32, this free space 40 running along a mechanically weak zone Zf of the collection tube 32, in order to prevent the entry of pressurised air from the high-pressure space 33 into the collection tube 32 in the event of the latter breaking.

Furthermore, a first sealing part as a sliding lead-through 2 (also sometimes referred to as a "yoyo") is disposed around the collection tube 32 and into the through port 38 while having a freedom of movement relative to the latter. This sliding lead-through 2 is connected to the casing 12c of the compressor 12 through a sealed coupling so as to prevent a significant air leak from the high-pressure space 33 at the coupling.

This sealed coupling is formed by a second sealing part 5, which includes a through opening 5a for passing the collection tube 32 through it. This second sealing part 5 has the shape of the sealing washer, comprising an outside annular surface forming a spherical surface portion. The sliding lead-through 2 has a free end 2c comprising an inside cylindrical surface which forms a circular line of contact with this spherical surface portion, so that the sliding lead-through 2 is sealingly hinged to the sealing washer 5. The hinge of the sliding lead-through 2 on the second sealing part 5 enables no stress to be generated on these parts during the relative movements of the casing 39 of the core compartment ZC with respect to the casing 12c of the compressor 12, particularly when the angle and/or the distance between both casings happen to vary. Indeed, the sliding lead-through 2 is intended to slide, that is to locally glide, on a surface integral with the casing 39, while remaining perpendicular to this surface.

On the other hand, the system 1 further includes a holding cover 3 attached to the casing 39 of the core compartment ZC of the turbine engine 10 and crossed by the collection tube 32, this holding cover 3 being arranged to sealingly connect the casing 39 and the sliding lead-through 2 while enabling a freedom of movement of the sliding lead-through 2 relative to the casing 39. The holding cover 3 includes a second through port 3a for inserting the collection tube 32.

The sliding lead-through 2 further includes a sliding lead-through plate 2a which has a planar portion able to abut against a corresponding planar portion of the holding cover 3 with the possibility of gliding over it. The freedom of movement of the sliding lead-through 2 is performed in a plane parallel to the planar portion while preventing a movement perpendicularly to this plane. Thus, the sliding lead-through plate 2a is disposed against the casing 39 of the core compartment ZC and a first through port 2b for inserting the collection tube 32.

The sliding lead-through 2 is relatively movably mounted between the collection tube 32 and the casing 39 of the core compartment ZC of the turbine engine 10. In particular, it is mounted so as to abut against the holding cover 3 with the possibility of gliding on the latter. Moreover, a clearance J is provided between the sliding lead-through plate 2*a* and an inside annular shoulder of the holding cover 3 abutting on the casing 39. The holding cover 3 therefore enables the sliding lead-through 2 to be axially held with respect to the casing 39. However, a small clearance not represented in FIG. 3 is provided between the outside surface of the casing 39 and the sliding lead-through plate 2*a*, so as to avoid a clamping of this plate 2*a* between the holding cover 3 and the casing 39. Indeed, the pressure in the high-pressure space 33 is higher than the one in the core compartment ZC and thus pushes the sliding lead-through 2 towards the outside, which results in pressing the plate 2*a* against the holding cover 3. There is then no longer a contact between the plate 2*a* and the casing 39.

The collection port 30 is formed by a boss 30*a* of the casing 12*c*, this boss having an opening crossing the casing 12*c* and extending along a port axis which corresponds to the axis of the collection tube 32. The inner surface Si which defines the opening of the boss is formed by a tapped bore 30*b* cooperating with a screw pitch 32*c* of the outer surface Se of the first end 32*b* of the collection tube 32. This way, attaching the collection tube 32 on the boss 30*a* is made possible by screwing the screw pitch 32*c* in the tapped bore 30*b*.

The sealing washer 5 is mounted on the boss 30*a* of the casing 12*c* of the compressor 12.

Moreover, in this first example of FIG. 3, the sealing means also include a protective tube 4 (outside tube) forming a partial shell around the collection tube 32.

The protective tube 4 is located between the collection tube 32 and the sliding lead-through 2. It includes an insertion cavity 4*a* for the partial entry of the collection tube 32 inside thereof.

Furthermore, as can be seen in this FIG. 3 and in FIGS. 4B-4D, the protective tube 4 includes a first end 4*b* attached to the first end 32*b* of the collection tube 32.

This first end 4*b* of the protective tube 4 includes a tapped portion 4*d* (locknut) cooperating with the threading 32*c* of the outer surface Se of the first end 32*b* of the collection tube 32.

Moreover, the protective tube 4 is radially located at a distance from the sliding lead-through 2, and includes a second free end 4*c* radially located at a distance from the collection tube 32. Thus, during the relative movements of the casing 39 of the core compartment ZC with respect to the casing 12*c* of the compressor 12, the protective tube 4 happens to be no longer in axial alignment with the sliding lead-through 2, but does not normally contact the sliding lead-through 2. Moreover, even if the collection tube 32 undergoes stresses imposing a slight flexure thereon, it does not normally contact the second end 4*c*. The integrity of the protective tube 4 is thus ensured especially by this second free end 4*c*. The protective tube 4 does not undergo any stress and can therefore never break.

On the other hand, as can be seen in FIG. 3, the first end 4*b* of the protective tube 4 is in contact with the sealing washer 5 so as to ensure a certain sealing at the contact surface.

Advantageously, should the inside collection tube 32 break, the leaking pressurisation air indicated by the arrow R1 would thus escape towards the core compartment ZC. Similarly, should the sliding lead-through 2 break, the leaking pressurisation air indicated by the arrow R2 would thus escape towards the core compartment ZC, but not on any account towards the circuit for pressurising the fuel tank that is inside the collection tube 32.

With reference to FIGS. 4A-4D, steps of a method for assembling the system 1 for supplying pressurised air of the first example of FIG. 3 will now be described.

In the first a) and second b) steps illustrated in FIG. 4A, the sealing washer 5 and the sliding lead-through 2 are respectively introduced in the turbine engine 10, by positioning the sealing washer 5 on the boss 30*a* of the casing 12*c* of the compressor 12, and then by placing the sliding lead-through 2 into sealed engagement with the sealing washer 5.

On the other hand, as illustrated in FIG. 4B, the protective tube 4 forming a locknut is screwed on the collection tube in a step c), by advancing according to the arrows F1 represented in FIG. 4B, by cooperation between the tapped portion 4*d* of the protective tube 4 on the threading 32*c* of the outer surface Se of the first end 32*b* of the collection tube 32.

As illustrated in FIG. 4C, an assembly formed by the protective tube 4 and the collection tube 32, screwed one on the other, is then obtained.

Then, as illustrated in FIG. 4D, according to a step d), this assembly is introduced in the turbine engine 10, by screwing the threading 32*c* of the collection tube 32 in the tapped bore 30*b* of the inner surface Si of the boss 30*a* of the collection port 30, by advancing according to the arrow F3 with a rotation according to the arrow F2. It is thus proceeded until the protective tube 4 contacts the sealing washer 5.

Finally, in a step e), the protective tube (4) forming a locknut is again clamped on the collection tube 32 in order to unit the assembly.

In FIG. 5, a second example of implementation of a system 1 for supplying pressurised air in accordance with the invention is partially represented.

In this second example, the common elements with those described with reference to FIG. 3 are not described again.

This second example of implementation essentially differs from the first example of implementation described with reference to FIG. 3 in that the means for attaching the collection tube 32 to the port 30 for collecting the pressurisation air do not here include a locknut, which enables to do without the protective tube 4.

Particularly, the sealing means are formed by the sealing washer 5 and the sliding lead-through 2.

However, in this example, the supply system 1 also includes a substantially annular clamping spring joint 6, placed between a first outer boss 32*d* of the collection tube 32 and the sealing washer 5.

This clamping joint 6 can be for example selected from the "Belleville" type washers or the single coil spring toothed lock washers.

On the other hand, the collection tube 32 also includes a second outer boss 32*e*, near the end of the tube 32 at which the tube is coupled in the core compartment ZC to a line (not represented) of the circuit for collecting hot pressurised air, represented by the arrowed path P in FIG. 1. Coupling the tube 32 to the line in the core compartment ZC results in stresses on the tube. As a result, in operation a risk of breakage (i.e. split) of the tube 32 cannot be totally excluded. The outer boss 32*e* is located at a distance from the first outer boss 32*d*, so that the portion of the collection tube 32 located between the first 32*d* and second 32*e* outer bosses makes up a mechanically weak zone Zf, that is a zone of mechanical brittleness, which is favoured in the event of the collection tube 32 breaking.

These first 32*d* and second 32*e* bosses are also present on the collection tube 32 of the example of implementation of FIG. 3. They enable the mechanically weak zones Zf to be defined at which a split of the collection tube 32 could occur in the event of an abnormally intense mechanical biasing.

On the other hand, the second outer boss 32e also enables the pressurisation air rate in case of a leak to be calibrated, for example in the event of the collection tube 32 and/or the sliding lead-through 2 breaking. To do so, as illustrated in FIG. 5, this second outer boss 32e is formed on the collection tube 32 substantially facing an outer boss 2d of the end of the sliding lead-through 2 from which the sliding lead-through plate 2a extends. These two bosses 32e and 2d then define therebetween a flow restricted channel of pressurisation air in the case of a leak. In the example of implementation of FIG. 3, an analogous restrictive channel is formed between the second boss 32e and the free end 4c of the protective tube 4. The air flow cross-section of this restricted channel can be adjusted at the assembly by setting the position of the protective tube 4 on the collection tube 32, as illustrated in FIG. 4C.

Advantageously, the space surrounding the mechanically weak zone Zf of the collection tube 32 is no longer at the pressure of the high-pressure space 33, but at a lower pressure than the one present inside the collection tube 32, namely the pressure of the core compartment ZC.

Should the collection tube 32 or the sliding lead-through 2 break, in other words split, the leaking pressurised air would then escape towards the core compartment ZC, but never in the circuit for pressurising the collection tube 32 towards the fuel tank.

Thus, advantageously in each of the embodiments described above, the sealing means of the system 1 for supplying pressurised air according to the invention enable to be sure that the pressurisation air contained in the high-pressure space 33 will not flow inside the collection tube 32 towards the fuel tank in the event of a leak. Consequently, any leak will discharge in the core compartment ZC, and not in the circuit for pressurising the fuel tank.

Moreover, the presence of the protective tube 4, such as according to the example of FIG. 3, or the particular disposition of the sliding lead-through 2 and of the sealing part 5, such as according to the example of FIG. 5, can enable the pressurisation air rate in case of a leak to be calibrated, and therefore the efficiency losses of the compressor 12 to be limited, and thus the penalties of specific fuel consumption (SFC) to be limited in the event of the collection tube failure.

Of course, the invention is not limited to the examples of implementation which have just been described. Various modifications can be brought thereto by those skilled in the art.

Figure 6:
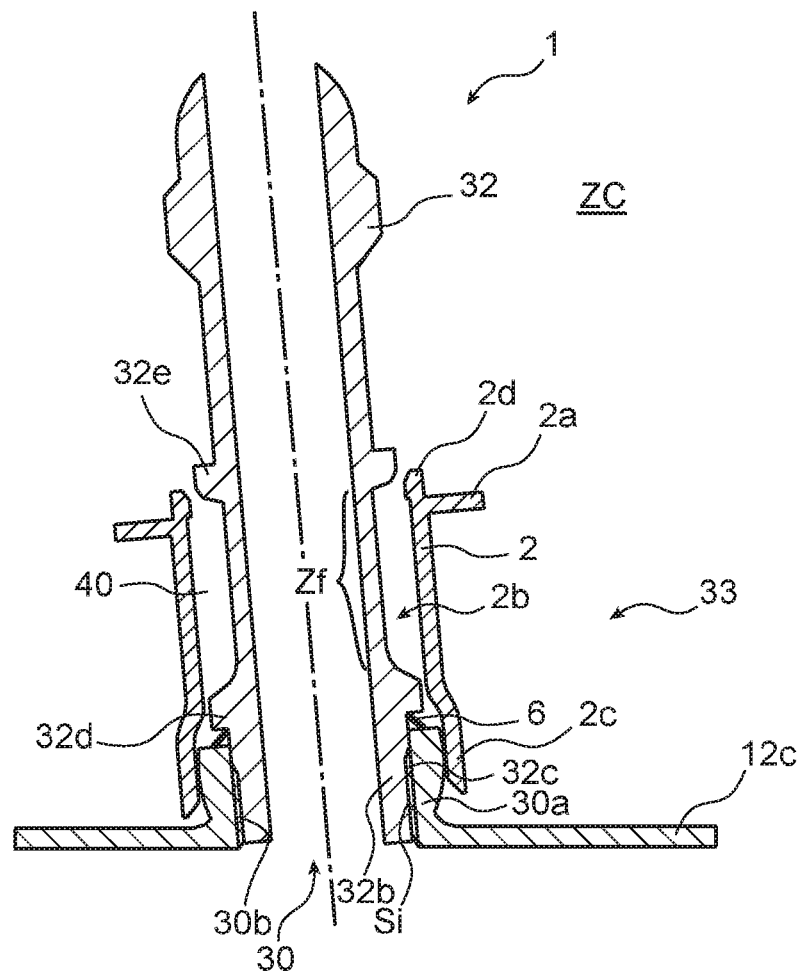
FIG. 6 represents, in an axial partial cross-sectional view, an alternative implementation of the example of FIG. 5.

In particular, in the examples previously described with reference to FIGS. 3, 4A, 4D and 5, the sealing washer 5 includes an outside annular surface forming a spherical surface portion. This spherical portion is comprised in the surface of a same sphere. However, according to an alternative implementation of the invention, for example according to an alternative implementation of the example of FIG. 5 such as illustrated in FIG. 6, it could be possible to do without such a sealing washer 5 and to form a spherical portion directly on the peripheral surface of the boss 30a forming the collection port 30.

The expression "including one" should be understood as being synonymous of "including at least one", unless otherwise specified.

What is claimed is:

1. A system for supplying pressurised air for an aircraft turbine engine, configured to supply pressurisation air to a portion of the aircraft for using compressed air from pressurisation air collected from a portion for collecting compressed air of the aircraft turbine engine, comprising:
   a port for collecting pressurisation air formed on a compressor casing of the compressed air collection portion of the aircraft turbine engine,
   a collection member coupled to a collection port to enable the collection and conveyance of the collected pressurisation air towards the portion for using compressed air,
   a through port of the collection member formed on a compartment casing of a compartment of the turbine engine, said compartment casing being subject to small movements relative to the compressor casing of the portion for collecting compressed air, the collection member crossing the through port with a freedom of movement relative to the latter during said small movements,
   a high-pressure space crossed by the collection member, located between the compressor casing and the compartment casing, and including pressurised air at a pressure higher than that of the collected pressurisation air,
   the system for supplying pressurised air also including sealing means located substantially between the compressor casing and the compartment casing in order to form a substantially sealed separation between the high-pressure space and a free space communicating with the compartment and provided around the collection member, in order to prevent the entry of pressurisation air from the high-pressure space into the collection member in the event of the latter breaking.

2. The system according to claim 1, wherein the sealing means include a first sealing part disposed around the collection member and into the through port while having a freedom of movement relative to the latter, this first sealing part being connected to the compressor casing by a sealed coupling so as to prevent a significant air leak from the high-pressure space at said coupling.

3. The system according to claim 2, wherein the sealed coupling is formed by a second sealing part comprising an outside annular surface forming a spherical surface portion, and wherein the first sealing part has a free end comprising an inside cylindrical surface which forms a circular line of contact with said spherical surface portion, so that the first sealing part is sealingly hinged on the second sealing part.

4. The system according to claim 1, wherein it comprises a holding cover attached to the compartment casing and crossed by the collection member, this holding cover being arranged to sealingly connect the compartment casing and the sealing means while enabling a freedom of movement of the sealing means relative to the compartment casing.

5. The system according to claim 4, wherein a first sealing part includes a sliding lead-through plate having a planar portion able to abut against a corresponding planar portion of the holding cover while having the possibility of gliding over the holding cover, the freedom of movement of the first sealing part being performed in a plane parallel to the planar portion while preventing a movement perpendicularly to this plane.

6. The system according to claim 1, wherein the collection port is formed by a boss on the compressor casing, an inner surface of which is formed by a tapped bore configured to cooperate with a threading of the outer surface of a first end of the collection member to enable the attachment of the collection member on the boss of the collection port.

7. The system according to claim 6, wherein a second sealing part is mounted on the boss of the compressor casing and includes a through opening for inserting the collection member.

8. The system according to claim 6, wherein a protective member forming an at least partial shell around the collection member is located between the collection member and a first sealing part and includes an insertion cavity for the at least partial entry of the collection member into the protective member said protective member being arranged to abut against a second sealing part once the collection member is attached on the boss of the collection port.

9. The system according to claim 8, wherein the protective member includes a first end mounted on the first end of the collection member, the first end of the protective member especially including a tapped portion intended to cooperate with a threading of the outer surface of the first end of the collection member, and wherein the protective member includes a second free end located at a distance from the collection member and from the first sealing part.

10. The system according to claim 9, wherein the first end of the protective member is in abutment on the second sealing part and is screwed on the first end of the collection member so as to make up a locknut for attaching the collection member on the boss of the collection port.

11. A method for assembling a system for supplying pressurised air according to claim 8, including the successive steps of:
 a) positioning the second sealing part in abutment on the boss of the compressor casing,
 b) placing the first sealing part in sealed engagement with the second sealing part,
 c) attaching the protective member on the collection member, by screwing a tapped portion of the protective member on the threading of the outer surface of the first end of the collection member,
 d) attaching the assembly formed by the protective member and the collection member on the collection port, by screwing the threading of the outer surface of the first end of the collection member in the tapped bore of the inner surface of the boss, until the protective member contacts the second sealing part,
 e) clamping again the protective member on the collection member in order to unite the assembly.

* * * * *